ized Feb. 20, 1962

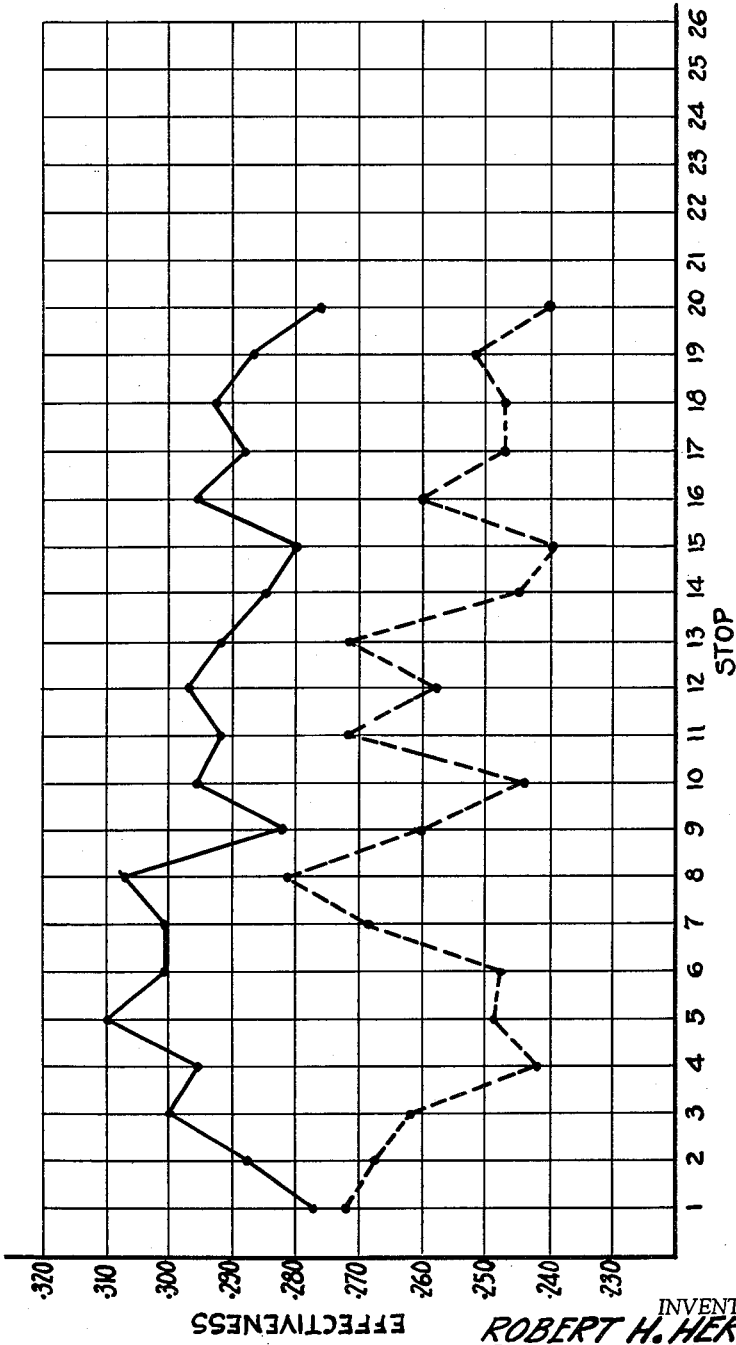

3,021,592
IRON-MOLYBDENUM SINTERED POWDERED METAL MATRIX

Robert H. Herron, George C. Reed, and Douglas J. Roth, South Bend, Ind., assignors to The Bendix Corporation, a corporation of Delaware
Filed Oct. 2, 1959, Ser. No. 844,044
14 Claims. (Cl. 29—182.5)

The present invention relates as indicated to a new and improved iron-molybdenum sintered powdered metal matrix; and more particularly to a new and improved friction material of the above mentioned type suitable for use in brakes, clutches and the like.

An object of the present invention is the provision of a new and improved friction material of the above described type which has a more uniform and consistent effectiveness throughout its useful life than have the prior art sintered powdered metal friction materials which contain iron and molybdenum.

Another object of the invention is the provision of a new and improved friction material of the above described type whose coefficient of friction, once the lining is broken in, does not fall appreciably below its original value throughout its useful service life.

A more detailed object of the present invention is the provision of a new and improved friction material having a matrix containing molybdenum and iron, and in which an appreciable portion of each is distributed generally uniformly throughout the friction material in the form of an alloy phase containing the two metals.

A still further object of the present invention is the provision of a new and improved friction material having a sintered powdered metal matrix formed by sintering a mixture of various metal powders including molybdenum and iron, and in which an alloy is formed in situ during the sintering operation.

Further objects and advantages of the present invention will become apparent to those skilled in the art to which the invention relates from the following description of applicants' preferred compositions and methods of forming the same which are described with reference to the accompanying drawings forming a part of this specification, and in which.

Figure 2:
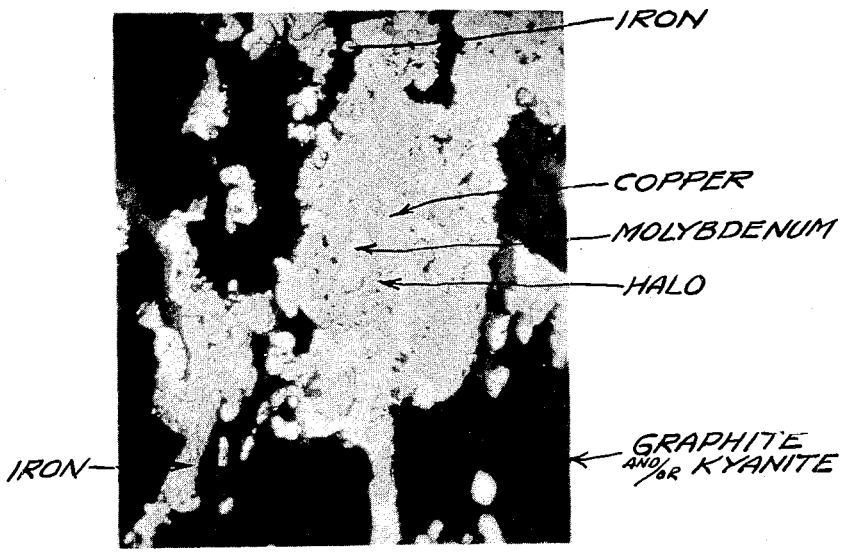
FIGURE 2 is a photomicrograph of a friction composition having a sintered powdered metal matrix embodying principles of the present invention, and in which there is shown an iron-molybdenum "halo" phase surrounding the particles of molybdenum.
Figure 3:
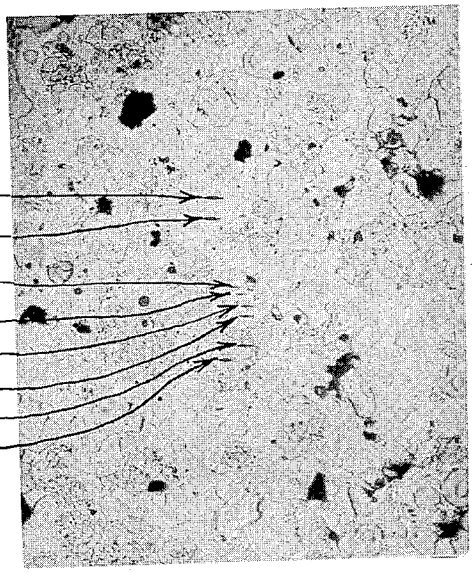

FIGURE 3 is a photomicrograph of a sintered powdered metal matrix similar to that shown in FIGURE 2 but formed without the incorporation of non-metallic friction controlling ingredients, and in which Knoop hardness tests were made across the "halo" phase; and FIGURE 4 is a graph showing a comparison of the coefficient of friction produced during successive test stops on a dynamometer of a lining having the "halo" phase with a lining having a similar composition but which does not have the "halo" phase.

Prior to the present invention, the assignee of the invention had been producing brake linings for jet aircraft which incorporated both molybdenum and iron. The linings which were made were generally of the type described in the Alfred W. Allen and Robert H. Herron application, Serial No. 688,917, filed October 8, 1957, now Patent No. 2,948,955, issued August 16, 1960. The inventors of that application found when molybdenum or its lower oxides were introduced somewhere in a brake structure whose rubbing friction producing surfaces contained a readily oxidizable form of iron, and which was operated at a red heat, that the molybdenum would reduce the iron oxides somewhat and prevent appreciable amounts of $Fe_2O_3$ from forming. This, it was found, reduced noise and chatter, particularly towards the end of a stop; and also appreciably reduced wear and increased the life of the brake.

The inventors of the present application have found that when antimony is mixed with powders of iron, copper, and molybdenum, and the resulting mixture of powders is sintered at a temperature between approximately 1700° F. and approximately 1800° F. in a highly reducing atmosphere which contains substantially no uncombined or combined oxygen, an alloy phase of the molybdenum and iron forms around the molybdenum and extends over into the iron. This phase we prefer to call "halo." It appears that antimony (and other low melting point metals which will later be mentioned) melt and wet both the molybdenum and the iron, dissolving a portion of each and carrying them into solution. Copper also appears to be dissolved by the molten antimony to extend the solution without causing it to turn into a solid phase. If a sintering temperature is used which melts the copper, no "halo" appears to form.

As previously mentioned, the sintering operation used with the antimony bearing powders of this invention must be performed in a highly reducing atmosphere if the "halo" is to form. The usual commercially used reducing atmospheres that are made by reducing water vapors with carbonaceous fuels to produce carbon monoxide and usually called "exo" gases, will not produce "halo" in antimony compositions. "Halo" appears to form, with antimony bearing powders, only when appreciable amounts of hydrogen are present such as is provided by the dissociation of ammonia. This is believed true because antimony is a strong reducing agent and becomes oxidized by carbon monoxide to the extent where it cannot perform its molten function.

In order to illustrate the differences in composition and method of making the same between the materials described in application Serial No. 688,917 and the present invention, a comparison will now be made.

Example I

A sample of the type of material described in application Serial No. 688,917 was made by thoroughly mixing together 32.5% copper, 32.5% iron, 5% molybdenum, 20% calcined kyanite and 10% graphite by weight of powders in the particle size range of approximately 80 to approximately 300 mesh. The mixture was compacted under a pressure of approximately 100,000 p.s.i. and then sintered at a temperature of approximately 1750° F. for 30 minutes in an electric furnace that was continually purged with substantially pure hydrogen.

Figure 1:
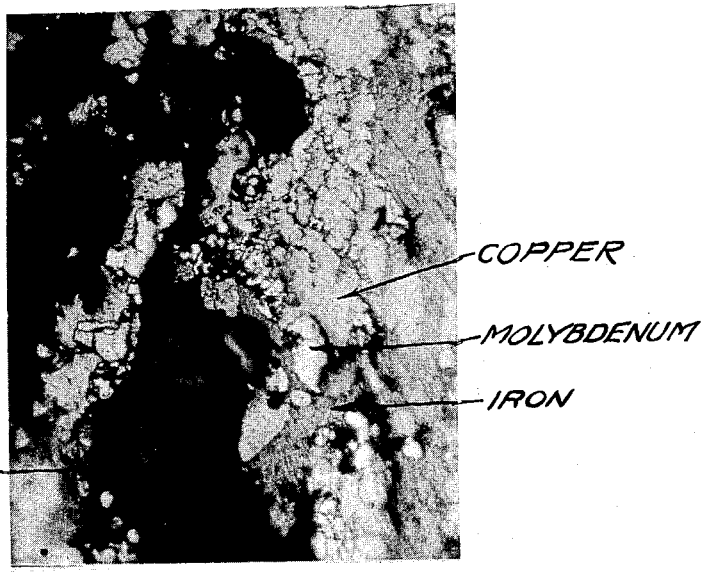
FIGURE 1 is a photomicrograph of a prior art friction composition having a sintered powdered metal matrix that includes molybdenum and iron particles, but which does not have the iron-molybdenum "halo" phase.

The material was then mounted, polished, etched with a 3% nitol solution and photomicrographed in the usual manner; and a print of the same is shown in FIGURE 1 of the drawing. The black areas of FIGURE 1 are graphite and/or kyanite, the globular areas are molybdenum, the light colored areas are copper, and the grey spongy areas are iron.

Example II

A typical example of a friction material prepared according to the present invention and which exhibits the improved frictional characteristics is prepared by thoroughly mixing together 31.25% copper, 31.25% iron, 5.0% molybdenum, 2.5% antimony, 20% calcined kyanite, and 10% graphite by weight of powders in the particle size range of approximately 80 to approximately 300 mesh. The mixture was compacted under a pressure of approximately 100,000 p.s.i. and then sintered at a temperature of approximately 1750° F. for 30 minutes in an electric furnace that was continually purged with a substantially pure hydrogen gas.

The material was then mounted, etched, etc., in the same manner as described in Example I and its photomicrograph is seen in FIGURE 2. The black areas of FIGURE 2 are graphite and/or kyanite, the globular areas are molybdenum, the light colored areas are copper, the dark grey areas are spongy iron, and the intermediate grey areas surrounding the molybdenum is the iron-molybdenum "halo" phase of the present invention.

In order to demonstrate the superior frictional characteristics of the materials of the present invention over those of the prior art, materials of the type described in Examples I and II were compacted in steel cups and mounted in a brake in the same manner as described in Stedman et al. Patent No. 2,784,105; and were tested in a dynamometer under conditions wherein the materials and the opposing surfaces took on a dull red temperature having surface temperatures of approximately 2500° F. The dynamometer was set up to simulate an F-94C aircraft stop, and after each stop the structures were allowed to cool to 150° F. Both materials were broken in by running one 60% energy stop and one 80% energy stop; and thereafter twenty stops were made with each brake. The coefficient of friction exhibited during each stop is shown in FIGURE 4 by a solid line for the material corresponding to Example II, and by a dotted line for the material corresponding to Example I. It will be seen that the materials of Example II, once broken in, had a coefficient of friction somewhat higher than that of the prior art material of Example I; and what is more important, its coefficient of friction stays above its initial value. The material of Example II gives more uniform results from one stop to the next than does the prior art material of Example I; and experience in actual brake operation on aircraft shows this to be even more true than is indicated by the results of the dynamometer tests shown in FIGURE 4. The more uniform results of the materials of the present invention over that of the prior art is believed caused by the more uniform and positive association of the molybdenum and iron; so that the oxidation state of the iron oxides that are formed, their distribution on the rubbing surfaces, and their rate of formation, are more uniformly controlled. It will be seen that with the material of Example I, the molybdenum must be gradually smeared across the face of the material to remove oxygen from the iron oxides present; and once a pocket of the molybdenum is torn out or worn away, the entire friction surface must be worn away until other pockets that are beneath its original surface are exposed.

*Example III*

The "halo" particles that are formed in the materials of the present invention are quite tiny and difficult to remove so that a spectrographic analysis is difficult. In order to identify the phase, a matrix devoid of the graphite and ceramic was made from the following mixture of powders, by weight, in the same manner as outlined in Example II: 44.8% copper, 44.8% iron, 7.4% molybdenum, and 3.0% antimony. The material was mounted, etched, etc., as in Example II and "Knoop Hardness Tests" were made across the "halo" phase as shown in FIGURE 3. It will be seen that the "halo" phase extends between the iron and the molybdenum; that its hardness is well above that of the copper, and that the hardness of the "halo" phase falls between that of the iron and molybdenum. It will further be seen that the hardness of the "halo" phase decreases with increasing distance away from the molybdenum and approaches that of the iron. It will further been seen that the amount of the "halo" phase is considerably greater than the amount of the generally pure molybdenum phase, so that the molybdenum is more uniformly distributed and associated with the iron than is the molybdenum in the prior art compositions illustrated in FIGURE 2.

It has been found that other low melting point metals which wet and dissolve the molybdenum, such as bismuth, cadmium and lead, can be used to produce the "halo" phase. When compositions including these metals are to be used, a slightly less reducing atmosphere can be tolerated; and in the case of lead, some carbon monoxide can be used provided an appreciable amount of carbon dioxide and uncombined oxygen are not present. In general, it is believed that iron is not appreciably soluble in bismuth, cadmium and lead; and that bismuth, cadmium, and lead dissolve molybdenum. It is also believed that bismuth, cadmium, and lead are very soluble in copper; and copper is soluble in iron. It therefore appears that the low melting point metals wet the iron, molybdenum and copper to dissolve an appreciable amount of the copper and some of the molybdenum, and thereafter bring into solution some of the iron—thereby more intimately associating the molybdenum with the iron and more uniformly distributing it throughout the composition.

*Example IV*

A mixture of powders having the following weight percentages was prepared in the same manner as that given in Example II:

31.25% copper, 31.25% iron, 5.0% molybdenum, 2.5% bismuth, 20% calcined kyanite, and 10% graphite. The sintering atmosphere used was the same as that described in Example II, and after the specimen was mounted, etched, etc., as in Example II, "halo" was found to be present.

*Example V*

A mixture of powders having the following weight percentages was prepared in the same manner as that given in Example II:

31.25% copper, 31.25% iron, 5.0% molybdenum, 2.5% cadmium, 20% calcined kyanite, and 10% graphite. The sintering atmosphere used was the same as that described in Example II, and after the specimen was mounted, etched, etc., as in Example II, some, but a considerably smaller amount of "halo," was present than existed in the previous examples.

*Example VI*

A mixture of powders having the following weight percentages was prepared in the same manner given in Example II:

31.25% copper, 31.25% iron, 5.0% molybdenum, 2.5% lead, 20% calcined kyanite, and 10% graphite. The compact was sintered in the same furnace at the same temperature and for the same length of time as in Example II; but an atmosphere of the following composition was used in place of that in Example II:

|  | Percent |
|---|---|
| CO | 10.0 |
| $H_2$ | 15.0 |
| $N_2$ | 68.5 |
| $CO_2$ | 5.0 |
| $CH_4$ | 1.5 |

"Halo" was present.

In order to determine the approximate ranges over which the percentages of the low melting point metals can be varied and still give "halo," the following experiments were performed.

*Example VII*

A mixture of powders having the following weight percentages was prepared, sintered and tested in the same manner as in Example II, and a very slight amount of "halo" was present:

32.0% copper, 32.0% iron, 5.0% molybdenum, 1.0% antimony, 20% kyanite, and 10% graphite.

*Example VIII*

A mixture of powders having the following weight percentages was prepared, sintered and tested in the same manner as in Example II and "halo" was present:

33.0% copper, 33.0% iron, 5.5% molybdenum, and 28.5% antimony.

For practical reasons, the smallest and largest percentages of molybdenum which have been tried are 1.0% and 50% respectively and "halo" was present in all instances although its amount varied.

*Example IX*

A mixture of powders having the following weight percentages was prepared, sintered, and tested in the same manner as in Example II and "halo" was present:

51.5% copper, 45.0% iron, 1.0% molybdenum, and 2.5% antimony.

*Example X*

A mixture of powders having the following weight percentages was prepared, sintered, and tested in the same manner as in Example II and "halo" was present:

23.1% copper, 23.1% iron, 50% molybdenum, and 3.8% antimony.

*Example XI*

A mixture of powders having the following weight percentages was prepared, sintered and tested in the same manner as in Example II and "halo" was present:

82.5% copper, 10% iron, 5% molybdenum, and 2.5% antimony.

*Example XII*

A mixture of powders having the following weight percentages was prepared, sintered and tested in the same manner as in Example II and "halo" was present:

2.5% copper, 90.0% iron, 5.0% molybdenum, and 2.5% antimony.

It will be seen that the low melting point metals have been varied from 1.0% to 28.5%, the molybdenum from 1.0% to 50.0%, the iron from 10% to 90%, and the copper from 2.5% to 82.5%; and that in every instance "halo" was formed. Since "halo" formed in every instance, it is reasonable to assume that "halo" will also form above and below these limits, so that they should only be regarded as approximations to generally describe the range over which the various elements are effective to form "halo."

While "halo" forms over the ranges above set forth, applicants find that for adequate stabilization of the coefficient of friction in brakes and the like, the low melting point metals should preferably be between about 2.5% to 5.0%, the molybdenum between about 3.0% to 10%, and the iron between 30% and 50% by weight of the matrix. There appears to be nothing critical in the amount of copper which is used, and since iron and copper are used to form the major body of the matrix, the amount of each which is used will be governed generally by the strength desired, coefficient of friction desired, and the temperature range of the application in which the material is to be used.

One preferred composition for aircraft brakes comprises:

| | Percent |
|---|---|
| Copper | 31.25 |
| Iron | 31.25 |
| Molybdenum | 5.0 |
| Antimony | 2.5 |
| Calcined kyanite | 20.0 |
| Graphite | 10.0 |

While we have illustrated and described the invention in considerable detail, various modifications may be made without departing from the true spirit and scope thereof; and we desire it to be understood that the invention is not limited except by the scope of the following claims which are intended to include all reasonable equivalents.

We claim:

1. A sintered powdered metal matrix consisting essentially of: from about 2.5% to about 82.5% copper, from about 10.0% to about 90% iron, from about 1.0% to about 50% molybdenum and from about 1.0% to about 28.5% of at least one metal from the group consisting of antimony, bismuth, cadmium and lead, and in which some of the iron and molybdenum form a phase in which the two are alloyed together.

2. A sintered powdered metal matrix consisting essentially of: from about 2.5% to about 82.5% copper, from about 10.0% to about 90% iron, from about 1.0% to about 50% molybdenum and from about 1.0% to about 28.5% of antimony, and in which some of the iron and molybdenum form a phase in which the two are alloyed together.

3. A sintered powdered metal matrix consisting essentially of: from about 2.5% to about 82.5% copper, from about 10.0% to about 90% iron, from about 1.0% to about 50% molybdenum and from about 1.0% to about 28.5% of bismuth and in which some of the iron and molybdenum form a phase in which the two are alloyed together.

4. A sintered powdered metal matrix consisting essentially of: from about 2.5% to about 82.5% copper, from about 10.0% to about 90% iron, from about 1.0% to about 50% molybdenum and from about 1.0% to about 28.5% of cadmium and in which some of the iron and molybdenum form a phase in which the two are alloyed together.

5. A sintered powdered metal matrix consisting essentially of: from about 2.5% to about 82.5% copper, from about 10.0% to about 90% iron, from about 1.0% to about 50% molybdenum and from about 1.0% to about 28.5% of lead, and in which some of the iron and molybdenum form a phase in which the two are alloyed together.

6. A sintered powdered metal matrix material consisting essentially of: from about 2.5% to about 82.5% copper, from about 10.0% to about 90% iron, from about 1.0% to about 50% molybdenum, and 1.0% to about 28.5% of at least one metal from the group consisting of antimony, bismuth, cadmium and lead, at least some of said iron and molybdenum being generally uniformly distributed throughout the matrix in particles that are substantially pure, and there being a "halo" phase extending between the iron and molybdenum particles and which wets and generally surrounds the molybdenum.

7. A sintered powdered metal matrix material consisting essentially of: from about 2.5% to about 82.5% copper, from about 10.0% to about 90% iron, from about 1.0% to about 50% molybdenum, and 1.0% to about 28.5% of antimony, at least some of said iron and molybdenum being generally uniformly distributed throughout the matrix in particles that are substantially pure, and there being a "halo" phase extending between the iron and molybdenum particles and which wets and generally surrounds the molybdenum.

8. A friction producing structure comprising: a pair of members having friction surfaces which engage each other at surface temperatures above approximately a dull red heat; one of said surfaces comprising a sintered powdered material consisting essentially of from about 2.5% to about 82.5% copper, from about 10.0% to about 90% iron, from about 1.0% to about 50% molybdenum, from about 1.0% to about 28.5% of at least one low melting point metal from the group consisting of antimony, bismuth, cadmium and lead, from about 1% to about 20% graphite, and from about 1% to about 30% of inorganic nonmetallic friction producing materials.

9. A friction producing structure comprising: a pair of members having friction surfaces which engage each other at surface temperatures above approximately a dull red heat; one of said surfaces comprising a sintered powdered material consisting essentially of from about 2.5% to about 82.5% copper, from about 10.0% to about 90% iron, from about 1.0% to about 50% molybdenum, from about 1.0% to about 28.5% of antimony, from about 1% to about 20% graphite, and from about 1% to about 30% of inorganic nonmetallic friction producing materials.

10. A friction producing structure comprising: a pair of members having friction surfaces which engage each other at surface temperatures above approximately a dull red heat; one of said surfaces comprising a sintered powdered material consisting essentially of from about 2.5% to about 82.5% copper, from about 10.0% to about 90% iron, from about 1.0% to about 50% molybdenum, from about 1.0% to about 28.5% of bismuth, from about 1% to about 20% graphite, and from about 1% to about 30% of inorganic nonmetallic friction producing materials.

11. A friction producing structure comprising: a pair of members having friction surfaces which engage each other at surface temperatures above approximately a dull red heat; one of said surfaces comprising a sintered powdered material consisting essentially of from about 2.5% to about 82.5% copper, from about 10.0% to about 90% iron, from about 1.0% to about 50% molybdenum, from about 1.0% to about 28.5% of cadmium, from about 1% to about 20% graphite, and from about 1% to about 30% of inorganic nonmetallic friction producing materials.

12. A friction producing structure comprising: a pair of members having friction surfaces which engage each other at surface temperatures above approximately a dull red heat; one of said surfaces comprising a sintered powdered material consisting essentially of from about 2.5% to about 82.5% copper, from about 10.0% to about 90% iron, from about 1.0% to about 50% molybdenum, from about 1.0% to about 28.5% of lead, from about 1% to about 20% graphite, and from about 1% to about 30% of inorganic nonmetallic friction producing materials.

13. A sintered powdered friction material having: graphite, and an inorganic nonmetallic friction producing material supported in a metal matrix consisting essentially of: from about 10% to about 90% iron; about 5% of molybdenum, from about 2.5% to about 82.5% copper, and about 2.5% of at least one low melting point metal from the group consisting of antimony, bismuth, cadmium, and lead, and in which at least some of said iron and molybdenum are generally uniformly distributed throughout the matrix in particles that are substantially pure, and there being a "halo" phase extending between the iron and molybdenum particles which wets and generally surrounds the molybdenum.

14. A sintered friction material having inorganic nonmetallic friction controlling materials dispersed throughout and supported by a metallic matrix consisting essentially of: from about 2.5 to about 5.0 percent of a low melting point metal from the group consisting of antimony, bismuth, cadmium and lead, from about 3.0 to about 10 percent of molybdenum, from about 2.5 to about 82.5 percent of copper, and from about 30 to about 50 percent of iron, and in which there is a "halo" phase extending between the iron and molybdenum particles which wets and generally surrounds the molybdenum.

References Cited in the file of this patent

UNITED STATES PATENTS

| | | |
|---|---|---|
| 2,783,529 | Huntress | Mar. 5, 1957 |
| 2,818,634 | Batchelor et al. | Jan. 7, 1958 |